Patented Jan. 16, 1951

2,538,722

UNITED STATES PATENT OFFICE 2,538,722

DIPHENYLTHIOPHENE FROM STYRENE

Lewis R. Drake, Midland, Mich., assignor to The Dow Chemical Company, Midland, Mich., a corporation of Delaware No Drawing. Application May 7, 1949, Serial No. 92,077

7 Claims. (Cl. 260—329)

This invention concerns an improved process for making diphenylthiophene from styrene and sulfur.

It is known to prepare diphenylthiophene by heating a mixture of sulfur and styrene to the atmospheric boiling point of styrene, or thereabout, until evolution of hydrogen sulfide is substantially complete and thereafter to recover the diphenylthiophene from the reaction mixture, e. g. by crystallization. However, when the reaction is carried out in such manner the yield of diphenylthiophene product, based on the weight of the starting materials, is not as high as is desired for production of diphenylthiophene on a commercial scale. The reaction appears to reach a state of equilibrium so that prolonged heating of the mixture at a reflux temperature does not materially increase the yield of diphenylthiophene product. Heating the mixture for a prolonged period of time increases the tendency toward polymerization of the styrene reactant which may also result in a lower yield of the diphenylthiophene product.

It is an object of the invention to provide a process for making diphenylthiophene from sulfur and styrene, which process results in an improved yield of diphenylthiophene based on the starting materials, than has heretofore been obtainable. Another object is to prepare diphenylthiophene by reacting sulfur and styrene in the vapor phase. A further object is to prepare diphenylthiophene by reacting sulfur with styrene at high temperatures. Other and related objects will be apparent from the following description of the invention.

According to the invention, diphenylthiophene can be prepared in good yield by procedure which involves precooking a mixture of the styrene and sulfur at a temperature corresponding to the atmospheric boiling point of styrene, or thereabout, until the mixture undergoes an initial reaction, thereafter heating the mixture to a reaction temperature above the boiling point of diphenylthiophene to produce a further reaction, cooling the mixture and recovering the diphenylthiophene product.

By precooking the mixture of styrene and sulfur and thereafter subjecting the mixture to further reaction at high temperatures, the reaction not only proceeds at a faster rate, but also proceeds to a greater degree of completion with resultant increased yields of diphenylthiophene product based on the weight of the starting materials, than can be obtained by carrying out the reaction at temperatures corresponding to the atmospheric boiling point of the mixture of styrene and sulfur.

The styrene and sulfur should be employed in certain relative proportions as hereinafter specified in order to reduce the tendency toward formation of undesirable by-products, e. g. ethylbenzene. Best results are usually obtained when the sulfur is used in amount not greater than a chemically equivalent proportion to react with the styrene, although lesser amounts of the sulfur may be used. The sulfur should not be used in amount greater than the proportions just stated since the presence of free sulfur in the reaction product renders it difficult to recover the diphenylthiophene in purified form. The styrene and sulfur are usually employed in amounts corresponding to from 0.67 to 1.5, preferably from 0.8 to 1.2, molecular proportions of styrene per molecular equivalent proportion of the sulfur.

It is important that the styrene and sulfur be mixed together and the mixture precooked at the atmospheric boiling point of styrene, or thereabout, e. g. at the reflux temperature of the mixture, for a time sufficient to cause a part of the styrene and sulfur to react prior to completing the reaction at the higher temperatures, in order to obtain the improved results in accordance with the invention. In general, precooking the mixture of styrene and sulfur at temperatures between 145° and 150° C., for a time of at least 2 hours, preferably from 2 to 4 hours, is satisfactory, although the mixture may be heated for longer periods of time at such temperatures.

In subjecting the mixture to further reaction at the higher temperatures, the reaction may be carried out in vapor, or in liquid phase, at temperatures between 400° and 600° C., preferably from 450° to 550° C., and at atmospheric, subatmospheric or superatmospheric pressure. The reaction is usually carried out at atmospheric pressure, or at superatmospheric pressures of from 15 to 100 pounds per square inch gauge pressure, depending upon whether the precooked styrene-sulfur solution is subjected to further reaction in the vapor phase, or in the liquid phase. In vapor phase, the reaction is preferably carried out at atmospheric pressure.

The reaction is carried out by passing the solution, or vapors of the precooked styrene-sulfur solution, through a tube, coil, or other suitable reactor wherein it is rapidly heated to the reaction temperature for a time sufficient to cause a further reaction between the sulfur and styrene.

In general, heating of the solution, or vapors of the solution, for a time of from 0.05 to 10 seconds, is satisfactory, although the mixture may be heated for longer periods of time, e. g. for a time of 60 seconds, without causing decomposition of the product, particularly when the reaction is carried out in the liquid phase and at the lower temperatures within the range herein specified. The materials should not be heated at the reaction temperatures for a time sufficient to cause decomposition of the product.

The reactor may be constructed of any suitable material such as glass, quartz, ceramic, glass enameled steel, or of iron alloys known to the trade as stainless steels, which materials are resistant to corrosion by hot sulfur vapor, or by hydrogen sulfide.

In practice, the styrene and sulfur are mixed together in the desired proportions and the mixture is heated to the atmospheric boiling point of styrene, or thereabout, with application of heating or cooling as required until the initial exothermic reaction subsides and the mixture forms a single phase. The solution is then precooked at temperatures between 145° and 150° C., for a time of at least two hours. Thereafter, the styrene-sulfur solution is fed into a heated zone, e. g. a quartz tube or a stainless steel coil, wherein it is rapidly heated to a reaction temperature between 400° and 600° C, for a time of from 0.05 to 10 seconds and is then cooled and the liquid product separated from the gaseous product, e. g. hydrogen sulfide, also formed in the reaction. The liquid product is fractionally distilled, preferably at atmospheric pressure, to separate lower boiling ingredients, e. g. ethylbenzene and unreacted styrene, and recover the diphenylthiophene product.

The following examples illustrate practice of the invention, but are not to be construed as limiting the scope thereof.

*Example 1*

A mixture consisting of 1040 grams (10 moles) of styrene and 480 grams (15 moles) of sulfur was placed in a reaction flask equipped with a reflux condenser and stirrer. The mixture was stirred and heated to temperatures between 145° and 150° C., over a period of four hours. During this reaction period 96 grams of hydrogen sulfide was evolved from the mixture. In a series of experiments separate portions each consisting of 200 grams of the solution was fed at an average rate of 7 grams per minute into one end of a heated quartz tube having an internal diameter of 1 inch and a length of 27 inches, wherein the solution was immediately vaporized and the vapor heated to a reaction temperature between 400° and 600° C. for a time of about 0.1 to 0.15 second. The vapor was then cooled to condense diphenylthiophene together with liquid products and the condensate collected from each of the runs as a separate fraction. The condensate was fractionally distilled at atmospheric pressure and the fraction distilling between 360° and 400° C., separated as diphenylthiophene product. In the following Table I there is reported the temperature in degrees centigrade to which the vapor was heated, the weight in grams of the condensate obtained by cooling the reaction vapors, the weight of the residue remaining after distillation of the condensate, the weight of the diphenylthiophene product and the per cent yield of diphenylthiophene, based on the combined weight of the styrene and sulfur starting materials. In the table the letters "D. P. T." are used to represent diphenylthiophene.

TABLE I

| Run No. | Temp., °C. | Condensate, Gms. | Residue, Gms. | D. P. T. | |
|---|---|---|---|---|---|
| | | | | Gms. | Per Cent |
| 1 | 400 | 185 | 41 | 79 | 37.2 |
| 2 | 450 | 165 | | 82.5 | 49.0 |
| 3 | 500 | 160.5 | 16 | 88 | 41.5 |
| 4 | 550 | 159.5 | 21.5 | 93 | 44.0 |
| 5 | 600 | 120 | | 63 | 29.7 |

For comparison, a portion of the above solution prepared by heating the mixture of styrene and sulfur at temperatures between 145° and 150° C., for a time of four hours was heated at a reflux temperature for an additional 32 hours, then fractionally distilled at atmospheric pressure. From a charge of 363 grams of the solution there was obtained 73 grams of diphenylthiophene and 84 grams of residue. The yield of diphenylthiophene was 20.2 per cent based on the combined weight of the styrene and sulfur starting material.

*Example 2*

A mixture consisting of 2085 grams (20 moles) of styrene and 640 grams (20 moles) of sulfur was placed in a reaction flask and heated at temperatures between 145° and 150° C., over a period of 4 hours. During this reaction period 109 grams of hydrogen sulfide was evolved from the mixture. In a series of separate experiments an amount consisting of 200 grams of the solution was passed in vapor form through the heated quartz tube as described in Example 1, and heated to temperatures between 400° and 550° C. The vapor was then cooled to condense liquid product together with diphenylthiophene. The diphenylthiophene was recovered by distillation of the condensate at atmospheric pressure. In Table II there is reported the temperature to which the vapor was heated in each of the experiments, the weight of the condensate obtained by cooling the reaction vapors, the weight in grams of the diphenylthiophene distilling at temperatures between 360° and 400° C., and the percent yield of diphenylthiophene, based on the combined weight of the styrene and sulfur starting materials.

TABLE II

| Run No. | Temp., °C. | Condensate, Gm. | D. P. T. | |
|---|---|---|---|---|
| | | | Gms. | Per Cent |
| 1 | 400 | 182.7 | 84.5 | 40.6 |
| 2 | 450 | 176 | 88.5 | 42.5 |
| 3 | 500 | 177 | 87.0 | 41.8 |
| 4 | 550 | 146.5 | 77.5 | 36.2 |

A charge consisting of 343 grams of the above solution, prepared by heating the mixture of styrene and sulfur to temperatures between 145° and 150° C. for a time of 4 hours, was distilled at atmospheric pressure. There was obtained 76 grams of diphenylthiophene. This represents a yield of 21.3 per cent, based on the combined weight of the styrene and sulfur starting material.

*Example 3*

A mixture consisting of 2085 grams (20 moles) of styrene and 640 grams (20 moles) of sulfur was heated to temperatures between 145° and 150° C. for a time of 4 hours. Thereafter, the hot solution was fed at an average rate of 10 cc. per minute into the heated quartz tube as described in Example 1, wherein the solution was vaporized and the vapor was heated to a temperature of 450° C. for a time of about 0.1 second, then cooled. The condensate obtained by cooling the reaction vapor was distilled at atmospheric pressure to recover the diphenylthiophene product. There was obtained 1372 grams of diphenylthiophene, distilling at temperatures between 360° and 400° C., with the main portion distilling at a temperature of 385° C. The yield was 50.2 per cent, based on the weight of the starting materials. A portion of the diphenylthiophene after crystallization from glacial acetic acid was a nearly white material having a melting point of 120°–122° C.

*Example 4*

A mixture consisting of 416 pounds (4.0 moles) of styrene and 128 pounds (4.0 moles) of sulfur was precooked at a temperature of about 145° C. over a period of 4 hours at atmospheric pressure. The solution was then passed under a pressure of from 15 to 30 pounds per square inch gauge, through a coil consisting of a one-quarter inch stainless steel pipe 12.5 feet long, wherein it was heated to a temperature of 400° C., then cooled and the liquid product separated from the hydrogen sulfide formed in the reaction. A total of 532 pounds of the precooked styrene-sulfur solution was fed into the coil at an average rate of from 53 to 65 pounds of the solution per hour. The liquid product from the reacted mixture was distilled at atmospheric pressure. There was obtained 162 pounds of diphenylthiophene.

Other modes of applying the principle of the invention may be employed instead of those explained, change being made as regards the method or steps herein disclosed, provided the method or steps stated by any of the following claims or the equivalent of such stated steps be employed.

I claim:

1. In a method for making 2,4-diphenylthiophene, the steps of precooking a mixture consisting of styrene and sulfur in amounts corresponding to from 0.67 to 1.5 molecular proportions of styrene per molecular equivalent proportion of sulfur by heating the mixture at temperatures between 145° and 150° C. for a time of at least two hours, thereafter heating the mixture at temperatures between 400° and 600° C. for a time not greater than 60 seconds and cooling the mixture.

2. In a method for making 2,4-diphenylthiophene, the steps of precooking a mixture consisting of styrene and sulfur in amounts corresponding to from 0.67 to 1.5 molecular proportions of styrene per molecular equivalent proportion of sulfur by heating the mixture at temperatures between 145° and 150° C. for a time of at least two hours, thereafter heating the mixture at temperatures between 400° and 600° C. for a time of from 0.05 to 10 seconds, cooling the mixture and recovering 2,4-diphenylthiophene from the mixture.

3. A method for making 2,4-diphenylthiophene as described in claim 2 wherein the reactions are carried out in the liquid phase.

4. In a method for making 2,4-diphenylthiophene, the steps of precooking a mixture consisting of styrene and sulfur in amounts corresponding to from 0.67 to 1.5 molecular proportions of styrene per molecular equivalent proportion of sulfur by heating the mixture at temperatures between 145° and 150° C. for a time of at least two hours, thereafter heating vapors of the mixture at temperatures between 400° and 600° C. for a time of from 0.05 to 10 seconds and cooling the vapors to condense 2,4-diphenylthiophene together with liquid products.

5. In a method for making 2,4-diphenylthiophene, the steps of precooking a mixture consisting of styrene and sulfur in amounts corresponding to from 0.67 to 1.5 molecular proportions of styrene per molecular equivalent proportion of sulfur, by heating the mixture at temperatures between 145° and 150° C. for a time of at least two hours, thereafter heating vapors of the mixture at temperatures between 400° and 600° C. for a time of from 0.05 to 10 seconds, cooling the reaction vapors to condense 2,4-diphenylthiophene together with liquid products and recovering the 2,4-diphenylthiophene from the condensate.

6. A process for making 2,4-diphenylthiophene as described in claim 5 wherein the vapors are heated at temperatures between 450° and 550° C.

7. A process for making 2,4-diphenylthiophene as described in claim 6 wherein the styrene and sulfur are employed in substantially equal molecular proportions.

LEWIS R. DRAKE.

REFERENCES CITED

The following references are of record in the file of this patent:

UNITED STATES PATENTS

| Number | Name | Date |
| --- | --- | --- |
| 2,478,914 | Greensfelder | Aug. 16, 1949 |

OTHER REFERENCES

Baumann, Berichte, 28, 893–894 (1895).